United States Patent [19]
Chandler et al.

[11] Patent Number: 5,801,612
[45] Date of Patent: Sep. 1, 1998

[54] ELECTRICAL DEVICE

[75] Inventors: Daniel A. Chandler, Menlo Park; Luis A. Navarro, Fremont; Edward F. Chu, Sunnyvale, all of Calif.

[73] Assignee: Raychem Corporation, Menlo Park, Calif.

[21] Appl. No.: 910,865

[22] Filed: Aug. 13, 1997

Related U.S. Application Data

[63] Continuation of Ser. No. 701,285, Aug. 22, 1996, abandoned.

[60] Provisional application No. 60/002,725, Aug. 24, 1995.

[51] Int. Cl.$^6$ .................................................. H01C 7/10
[52] U.S. Cl. ........................................................ 338/22 R
[58] Field of Search ............................. 338/9, 20, 21, 338/22 R, 23, 24, 277; 320/2, 48

[56] References Cited

U.S. PATENT DOCUMENTS

| | | | |
|---|---|---|---|
| 3,870,950 | 3/1975 | Laass | 324/556 |
| 4,237,441 | 12/1980 | van Konynenburg et al. | 338/22 R |
| 4,255,698 | 3/1981 | Simon | 320/35 |
| 4,388,607 | 6/1983 | Toy et al. | 338/22 SD |
| 4,534,889 | 8/1985 | van Konynenburg et al. | 252/511 |
| 4,545,926 | 10/1985 | Fouts, Jr. et al. | 252/511 |
| 4,560,498 | 12/1985 | Horsma et al. | 252/511 |
| 4,591,700 | 5/1986 | Sopory | 219/505 |
| 4,689,475 | 8/1987 | Kleiner et al. | 219/553 |
| 4,724,417 | 2/1988 | Au et al. | 338/22 R |
| 4,774,024 | 9/1988 | Deep et al. | 252/511 |
| 4,800,253 | 1/1989 | Kleiner et al. | 219/553 |
| 4,935,156 | 6/1990 | van Konynenburg et al. | 219/553 |
| 4,973,936 | 11/1990 | Dimpault-Darcy et al. | 338/32 R |
| 5,049,850 | 9/1991 | Evans | 338/22 R |
| 5,089,801 | 2/1992 | Chan et al. | 338/22 R |
| 5,150,033 | 9/1992 | Conway | 320/51 |
| 5,174,924 | 12/1992 | Yamada et al. | 252/511 |
| 5,250,228 | 10/1993 | Baigrie et al. | 252/511 |
| 5,378,407 | 1/1995 | Chandler et al. | 252/513 |
| 5,436,609 | 7/1995 | Chan et al. | 338/22 R |
| 5,451,919 | 9/1995 | Chu et al. | 338/22 R |
| 5,582,770 | 12/1996 | Chu et al. | 252/511 |
| 5,592,068 | 1/1997 | Gregory et al. | 320/21 |

FOREIGN PATENT DOCUMENTS 4-75287  10/1992  Japan.

*Primary Examiner*—Matthew V. Nguyen
*Attorney, Agent, or Firm*—Marguerite E. Gerstner; Herbert G. Burkard; Timothy H. P. Richardson

[57] ABSTRACT

A circuit protection device for protecting batteries is formed from a resistive element composed of a PTC conductive polymer composition and two electrodes. The device has a resistive element thickness of 0.025 to 0.20 mm; a crosslinking level equivalent to 1 to 20 Mrads; a surface area of at most 120 mm$^2$; a resistance at 20° C., $R_{20}$, of at most 0.030 ohm; and a resistivity at 20° C., $\rho_{20}$, of at most 2.0 ohm-cm. Devices of the invention are sufficiently small to be easily inserted into an assembly comprising a battery, particularly a rechargeable battery, and the device. Such assemblies are used for powering portable electronic equipment such as cellular telephones.

17 Claims, 2 Drawing Sheets

ELECTRICAL DEVICE

BACKGROUND OF THE INVENTION

CROSS-REFERENCE TO RELATED APPLICATIONS

This application is an application under 35 USC 111(a) and claims priority under 35 USC 119 from Provisional Application Ser. No. 60/002,725, filed Aug. 24, 1995 under 35 USC 111(b), the disclosure of which is incorporated herein by reference. This application is a continuation of commonly assigned application Ser. No. 08/701,285, filed Aug. 22, 1996, abandoned, the disclosure of which is incorporated herein by reference.

FIELD OF THE INVENTION

This invention relates to circuit protection devices comprising conductive polymers, particularly circuit protection devices for use in protecting batteries.

INTRODUCTION TO THE INVENTION

Circuit protection devices for use in protecting batteries from overcurrent and overtemperature conditions are well-known. See, for example, U.S. Pat. Nos. 4,255,698 (Simon) and 4,973,936 ((Dimpault-Darcy et al), and Japanese Utility Model Application No. 4-75287 (filed Oct. 29, 1992), the disclosures of which are incorporated herein by reference. In these applications, a device which exhibits a positive temperature coefficient of resistance (PTC behavior) is connected in series with a battery terminal. During normal operation the PTC device is in a low resistance, low temperature condition. When a very high current occurs, for example, due to a short circuit, or a very high temperature occurs, for example, during excessive charging, the device "switches" into a high resistance, high temperature condition, thus decreasing the current through the battery to a low level and protecting any components in contact with the battery. The temperature at which this transition from low resistance to high resistance occurs is the switching temperature, $T_s$. $T_s$ is defined as the temperature at the intersection point of extensions of the substantially straight portions of a plot of the log of the resistance of the PTC element as a function of temperature which lie on either side of the portion of the curve showing a sharp change in slope.

Battery packs, in which a plurality of batteries, i.e. cells, are present, are commonly used with electrical equipment such as cameras, video recorders, tools, portable computers, and cellular phones. It is desirable to make the battery packs as small and lightweight as possible, but still provide adequate protection in the event of a short circuit, a runaway charge fault, charging at the wrong voltage, and/or reverse charging. One technique to maximize the use of space in the battery pack is to place the PTC device directly onto the button terminal of the battery, inside the battery pack. If the device is in the form of a disk with a central hole, the hole can be sized to allow it to be placed over the button terminal. Electrical connection is then made from an electrode on one surface of the disk to the button terminal and from an electrode on the opposite surface of the disk to a second battery. Alternatively, the PTC device can be in the form of a chip with attached straps. One strap is electrically connected to the button terminal of one battery and the other strap is attached to the second battery. Such an arrangement is useful in applying the device outside the battery pack.

Battery packs for cellular phones have special requirements. Due to the digital nature of such phones, battery packs are discharged in short bursts of high current. Because the circuit protection device is in series with the cells of the pack, there may be an unacceptable high voltage drop across the protection device if the device resistance in the unswitched state is too high. This attenuates the pulse and results in audio static as well as reduced battery capacity. In addition to requiring a very low resistance, i.e. less than 30 milliohms, it is also desirable that the device have a low switching temperature, i.e. less than 100° C., so that batteries with relatively long discharge times, e.g. nickel-metal hydride batteries and lithium-ion batteries, which are sensitive to over-temperature conditions switch at a temperature low enough to prevent damage to the battery itself or the case surrounding it. Thus an appropriate circuit protection device will provide recharging protection by protecting in the event of overtemperature conditions, and will provide discharging protection by protecting in the event of overcurrent conditions. In addition, the device should be as small as possible in order to conserve space within the battery pack. This is particularly important as electrical equipment continues to decrease in size.

SUMMARY OF THE INVENTION

We have now found that a circuit protection device that meets the requirements of battery pack protection under both overtemperature and overcurrent conditions can be made small enough and with sufficiently low switching temperature and resistance if a particular composition, dimensions, and process are used. Such devices allow protection against charger runaway voltages for portable electronic equipment. Thus this invention provides a circuit protection device for protecting batteries which comprises (A) a resistive element which is composed of a PTC conductive polymer composition which comprises
  (1) a polymeric component having (a) a crystallinity of less than 40% and (b) a melting point $T_m$ of less than 110° C., and
  (2) dispersed in the polymeric component, a particulate conductive filler; and (B) two electrodes which (1) are attached to the resistive element, (2) comprise metal foils, and (3) can be connected to a source of electrical power, said device having the following characteristics:
  (i) a resistive element thickness of 0.025 to 0.20 mm;
  (ii) a crosslinking level equivalent to 1 to 20 Mrads;
  (iii) a surface area of at most 120 mm$^2$;
  (iv) a resistance at 20° C., $R_{20}$, of at most 0.030 ohm; and
  (v) a resistivity at 20° C., $\rho_{20}$, of at most 2.0 ohm-cm.

In a second aspect, the invention provides an assembly which comprises
  (I) a battery; and
  (II) a circuit protection device of the first aspect of the invention which is in electrical contact with the battery.

DETAILED DESCRIPTION OF THE INVENTION

Figure 1:
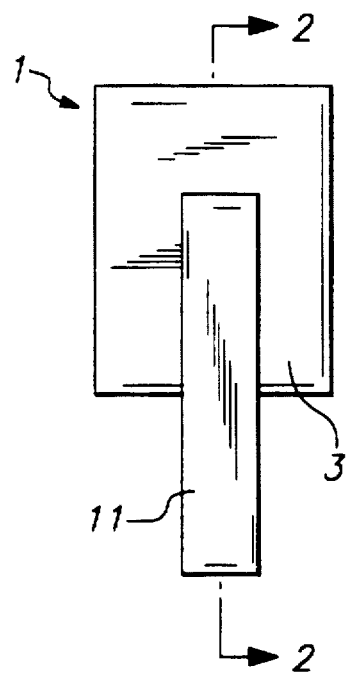
FIG. 1 is a plan view of a device of the invention.

The circuit protection device of the invention comprises a resistive element composed of a PTC conductive polymer composition. Such compositions comprise a polymeric component, and dispersed therein, a particulate conductive filler such as carbon black or metal. Conductive polymer compositions are described in U.S. Pat. Nos. 4,237,441 (van Konynenburg et al), 4,388,607 (Toy et al), 4,534,889 (van Konynenburg et al), 4,545,926 (Fouts et al), 4,560,498 (Horsma et al), 4,591,700 (Sopory), 4,724,417 (Au et al), 4,774,024 (Deep et al), 4,935,156 (van Konynenburg et al), 5,049,850 (Evans et al), 5,250,228 (Baigrie et al), 5,378,407 (Chandler et al), and 5,451,919 (Chu et al), and in pending U.S. Application Ser. Nos. 08/255,497 (Chu et al, filed Jun. 8, 1994) now U.S. Pat. No. 5,582,771, 08/408,768 (Toth et al, filed Mar. 22, 1995) now abandoned in favor of continuation application Ser. No. 08/798,887, filed Feb. 10, 1997, and 08/408,769 (Wartenberg et al, filed Mar. 22, 1995) now abandoned in favor of continuation application Ser. No. 08/789,962, filed Jan. 30, 1997. The disclosure of each of these patents and applications is incorporated herein by reference.

The composition exhibits positive temperature coefficient (PTC) behavior, i.e. it shows a sharp increase in resistivity with temperature over a relatively small temperature range. The term "PTC" is used to mean a composition or device that has an $R_{14}$ value of at least 2.5 and/or an $R100$ value of at least 10, and it is preferred that the composition or device should have an $R_{30}$ value of at least 6, where $R_{14}$ is the ratio of the resistivities at the end and the beginning of a 14° C. range, $R_{100}$ is the ratio of the resistivities at the end and the beginning of a 100° C. range, and $R_{30}$ is the ratio of the resistivities at the end and the beginning of a 30° C. range. It is preferred that compositions of the invention show a PTC anomaly at at least one temperature over the range from 20° C. to $(T_m+5°$ C.) of at least $10^4$, preferably at least $10^{4.5}$, particularly at least $10^5$, especially at least $10^{5.5}$, i.e. the log[resistance at $(T_m+5°$ C.)/resistance at 20° C.] is at least 4.0, preferably at least 4.5, particularly at least 5.0, especially at least 5.5. If the maximum resistance is achieved at a temperature $T_x$ that is below $(T_m+5°$ C.), the PTC anomaly is determined by the log(resistance at $T_x$/resistance at 20° C.). In order to ensure that effects of processing and thermal history are neutralized, at least one thermal cycle from 20° C. to $(T_m+5°$ C.) and back to 20° C. should be conducted before the PTC anomaly is measured.

The polymeric component of the composition comprises one or more crystalline polymers and has a crystallinity of at most 40%, preferably at most 35%, particularly at most 30%, as measured by a differential scanning calorimeter. For some applications it may be desirable to blend the crystalline polymer(s) with one or more additional polymers, e.g. an elastomer or an amorphous thermoplastic polymer, in order to achieve specific physical or thermal properties, e.g. flexibility or maximum exposure temperature. It is preferred that the polymeric component comprise a low density polymer, i.e. a polymer having a density of less than about 0.935 g/cm$^3$. Examples of such low density polymers are low density polyethylene and ethylene copolymers, in particular an ethylene copolymer that comprises units derived from a first monomer which is ethylene and a second monomer which is an alkyl acrylate having the formula $CH_2=CHCOOC_mH_{2m+1}$, where m is at least 4. Particularly preferred are ethylene/butyl acrylate copolymer (also referred to as ethylene/n-butyl acrylate) and ethylene/isobutyl acrylate copolymer, for which m equals 4. The polymeric component has a melting temperature, as measured by the peak of the endotherm of a differential scanning calorimeter, of $T_m$. When there is more than one peak, $T_m$ is defined as the temperature of the highest temperature peak.

For compositions suitable for battery protection $T_m$ is at least 70° C., but is less than 110° C., preferably less than 100° C.

Dispersed in the polymeric component is a particulate conductive filler that comprises carbon black. For some applications, other particulate conductive materials such as graphite, metal, metal oxide, conductive coated glass or ceramic beads, particulate conductive polymer, or a combination of these, may also be present. Such particulate conductive fillers may be in the form of powder, beads, flakes, or fibers. It is preferred, however, that the particulate filler consist essentially of carbon black that has a DBP number of 60 to 120 cm$^3$/100g, preferably 60 to 100 cm$^3$/100g, particularly 60 to 90 cm$^3$/100g, especially 65 to 85 cm$^3$/100g. The DBP number is an indication of the amount of structure of the carbon black and is determined by the volume of n-dibutyl phthalate (DBP) absorbed by a unit mass of carbon black. This test is described in ASTM D2414-93, the disclosure of which is incorporated herein by reference.

The conductive polymer composition may comprise additional components, such as antioxidants, inert fillers, nonconductive fillers, radiation crosslinking agents (often referred to as prorads or crosslinking enhancers), stabilizers, dispersing agents, coupling agents, acid scavengers (e.g. $CaCO_3$), or other components.

The desired resistivity of the composition determines the amount of polymeric component, conductive filler, and option additional components. It is preferred that the device prepared from the composition have a resistivity at 20° C., $\rho 20$, of at most 2.0 ohm-cm, preferably at most 1.5 ohm-cm, particularly at most 1.0 ohm-cm, especially at most 0.9 ohm-cm, most especially at most 0.8 ohm-cm. For compositions meeting these criteria, the polymeric component generally comprises at most 64% by volume, preferably at most 62% by volume, particularly at most 60% by volume, especially at most 58% by volume of the total volume of the composition. The quantity of conductive filler needed is based on the resistivity of the conductive filler itself, as well as on the required resistivity of the composition. For compositions of the invention, the conductive filler generally comprises at least 36% by volume, preferably at least 38% by volume, particularly at least 40% by volume of the total volume of the composition. The additional components generally comprise at most 20% by volume of the total composition.

While dispersion of the conductive filler and other components in the polymeric component may be achieved by any suitable means of mixing, including solvent-mixing, it is preferred that the composition be melt-processed using melt-processing equipment including mixers made by such manufacturers as Brabender, Moriyama, and Banbury, and continuous compounding equipment, such as co- and counter-rotating twin screw extruders. Prior to mixing, the components of the composition can be blended in a blender such as a Henschel™ blender to improve the uniformity of the mixture loaded into the mixing equipment. The composition can be prepared by using a single melt-mixing step, but it is often advantageous to prepare it by a method in which there are two or more mixing steps, as described in copending U.S. application No. 08/408,769 (Wartenberg et al, filed Mar. 22, 1995) now abandoned in favor of continuation application Ser. No. 08/789,962, filed Jan. 30, 1997 the disclosure of which is incorporated herein by reference.

After mixing, the composition can be melt-shaped by any suitable method, e.g. melt-extrusion, injection-molding, compression-molding, and sintering, in order to produce a resistive element. The element may be of any shape, e.g. rectangular, square, circular, or annular. For many applications, it is desirable that the composition be extruded into sheet from which the resistive element may be cut, diced, or otherwise removed.

For the circuit protection devices of the invention the resistive element is in physical and electrical contact with at least one electrode that is suitable for connecting the element to a source of electrical power. The type of electrode is dependent on the shape of the element, and may be, for example, solid or stranded wires, metal foils, metal meshes, or metallic ink layers. Particularly useful devices comprise two laminar electrodes, preferably metal foil electrodes, with the conductive polymer resistive element sandwiched between them. Particularly suitable foil electrodes have at least one surface that is electrodeposited, preferably electrodeposited nickel or copper. Appropriate electrodes are disclosed in U.S. Pat. Nos. 4,689,475 (Matthiesen), 4,800,253 (Kleiner et al), and copending U.S. application Ser. No. 08/672,496 (Chandler et al, Jun. 28, 1996, which is a continuation of application Ser. No. 08/255,584, filed Jun. 8, 1994, now abandoned) now abandoned in favor of continuation application Ser. No. 08/816,471, filed Mar. 13, 1997, the disclosure of each of which is incorporated herein by reference. The electrodes may be attached to the resistive element by compression-molding, nip-lamination, or any other appropriate technique. Additional metal leads, e.g. in the form of wires or straps, can be attached to the foil electrodes to allow electrical connection to a circuit. The leads may extend in opposite directions from the surface of the resistive element to form an "axial" device, or they may extend in the same direction from the resistive element to form a "radial" device. In addition, elements to control the thermal output of the device, e.g. one or more conductive terminals, can be used. These terminals can be in the form of metal plates, e.g. steel, copper, or brass, or fins, that are attached either directly or by means of an intermediate layer such as solder or a conductive adhesive, to the electrodes. See, for example, U.S. Pat. Nos. 5,089,801 (Chan et al) and 5,436,609 (Chan et al).

In order to improve the electrical stability of the device, it is generally necessary to subject the resistive element to various processing techniques, e.g. crosslinking and/or heat-treatment, following shaping, before and/or after attachment of the electrodes. Crosslinking can be accomplished by chemical means or by irradiation, e.g. using an electron beam or a $Co^{60}$ γ irradiation source. Devices of the invention are generally crosslinked to the equivalent of 1 to 20 Mrads, preferably 1 to 15 Mrads, particularly 2 to 15 Mrads, especially 5 to 12 Mrads.

Devices of the invention are preferably exposed to a thermal treatment after the device is cut from a laminate comprising the conductive polymer composition positioned between two metal foils, and before crosslinking of the conductive polymer composition is done. A preferred procedure is described in U.S. patent application Ser. No. 08/408,768 (Toth et al, filed Mar. 22, 1995) now abandoned in favor of continuation application Ser. No. 08/798,887, filed Feb. 10, 1997, the disclosure of which is incorporated herein by reference. The device is first cut from the laminate in a cutting step. In this application, the term "cutting" is used to include any method of isolating or separating the resistive element of the device from the laminate, e.g. dicing, punching, shearing, cutting, etching and/or breaking as described in pending U.S. application Ser. No. 08/257,586 (Zhang et al, filed Jun. 9, 1994) now abandoned in favor of continuation application Ser. No. 08/808,135, filed Feb. 28, 1997, the disclosure of which is incorporated herein by reference, or any other suitable means.

The thermal treatment requires that the device be subjected to a temperature Tt that is greater than $T_m$, preferably at least ($T_m+20°$ C.), particularly at least ($T_m+50°$ C.), especially at least ($T_m+70°$ C.). The duration of the thermal exposure may be very short, but is sufficient so that the entire conductive polymer in the resistive element reaches a temperature of at least ($T_m+5°$ C.). The thermal exposure at $T_t$ is at least 0.5 seconds, preferably at least 1.0 second, particularly at least 1.5 seconds, especially at least 2.0 seconds. A suitable thermal treatment for devices of the invention made from ethylene/butyl acrylate copolymer is dipping the device into a solder bath heated to a temperature of about 240 to 245° C., i.e. at least 100° C. above $T_m$, for a period of 1.5 to 2.5 seconds. Alternatively, good results have been achieved by passing the devices through an oven on a belt and exposing them to a temperature at least 100° C. above $T_m$ for 3 seconds. During either one of these processes, electrical leads can be attached to the electrodes by means of solder.

After exposure to the thermal treatment, the device is cooled to a temperature below $T_m$, i.e. to a temperature of at most ($T_m-30°$ C.), preferably at most ($T_m-50°$ C.), especially at most ($T_m-70°$ C.). It is particularly preferred that the device be cooled to a temperature at which the conductive polymer composition has achieved 90% of it maximum crystallization. Cooling to room temperature, particularly to 20° C., is particularly preferred. The cooled device is then crosslinked, preferably by irradiation.

Devices of the invention are particularly useful because they have smaller mass and lower resistance than conventional devices, thus decreasing the weight for a given application. The thickness of the resistive element is 0.025 to 0.20 mm (0.001 to 0.008 inch), preferably 0.051 to 0.18 mm (0.002 to 0.007 inch), e.g. 0.13 mm (0.005 inch). The surface area of the device (i.e. the footprint of the resistive element, not including any additional metal leads) is at most 120 $mm^2$, preferably at most 100 $mm^2$, particularly at most 90 $mm^2$, especially at most 85 $mm^2$. Larger devices tend to dissipate more heat than is desirable for most battery applications, and are more difficult to install in the available space of a battery pack.

Devices of the invention have a resistance at 20° C., $R_{20}$, of at most 0.050 ohm, preferably at most 0.040 ohm, particularly at most 0.030 ohm, especially at most 0.025 ohm.

Devices of the invention are particularly suitable for use in a battery assembly which may comprise one or more batteries. A typical assembly comprises first and second batteries. The device is in electrical contact with at least one of the batteries, often by contacting the button terminal of the battery (i.e. the positive terminal), and may be in contact with a second battery, generally at the end opposite the button terminal end (i.e. the negative terminal). The battery for which the small devices of the invention are particularly useful is a secondary rechargeable battery of the size equivalent to type AAA, AA, or 5 mm prismatic cells. Such a battery may be a nickel-cadmium, nickel-metal hydride, or lithium-ion battery.

Figure 2:
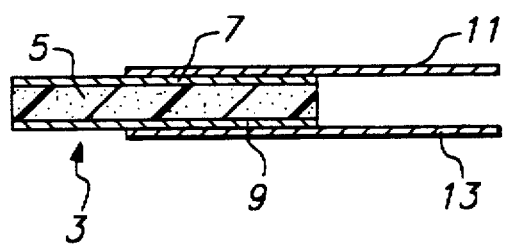
FIG. 2 is a cross-sectional view of the device of FIG. 1 along line 2—2.
Figure 3:
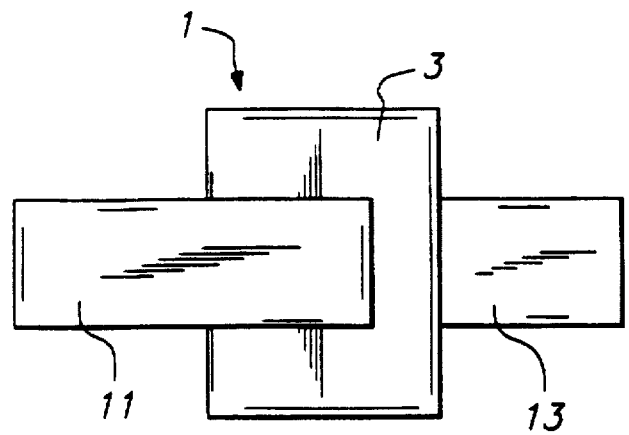
FIG. 3 is a plan view of another device of the invention.

The invention is illustrated by the drawing in which FIG. 1 is a plan view of circuit protection device 1 and FIG. 2 is a cross-sectional view along line 2—2 of FIG. 1. The device consists of PTC element 3 to which are attached first and second metal leads 11,13 in a configuration to give a radial device. PTC element 3 comprises resistive element 5 which is sandwiched between two metal electrodes 7,9. FIG. 3 shows an alternative configuration for the first and second leads 11,13 to give an axial device particularly suitable for attachment to the terminals of a battery.

Figure 4:
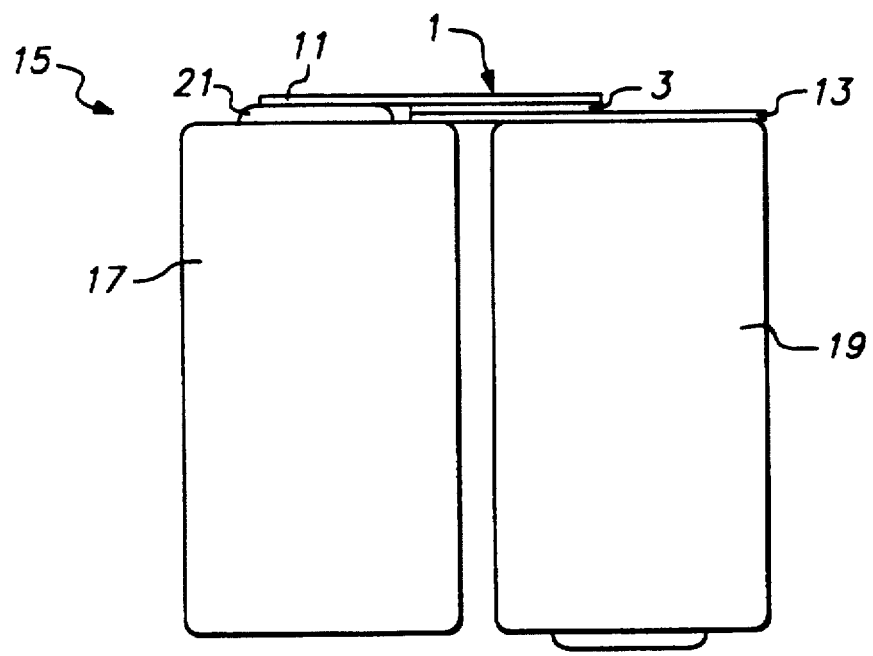
FIG. 4 is a schematic view of an assembly of the invention.

FIG. 4 is a schematic plan view of assembly 15 of the invention in which first battery 17 and second battery 19 are in physical and electrical contact with device 1. First lead 11 contacts button terminal 21 of first battery 17, while second lead 13 contacts second battery 19.

The invention is illustrated by the following example.

EXAMPLE

Fifty-eight percent by volume of ethylene/n-butyl acrylate copolymer (Enathene™ EA 705-009, containing 5% n-butyl acrylate, having a melt index of 3.0 g/10 min and a melting temperature of 105° C., available from Quantum Chemical Corporation) was preblended with 42% by volume carbon black (Raven™ 430 Ultra, having a particle size of about 82 nm, a structure (DBP number) of 80 cm$^3$/100 g, and a surface area of 34 m$^2$/g, available from Columbian Chemicals), and the blend was then in a co-rotating twin screw extruder. The mixture was pelletized and extruded into a sheet having a thickness of 0.127 mm (0.005 inch). The sheet was nip-laminated with two layers of electrode-posited nickel-copper foil (Type 31, having a thickness of 0.043 ram (0.0013 inch), available from Fukuda) to produce a laminate. Pieces of the laminate were solder-coated. PTC elements with dimensions of 5×12×0.127 mm (0.2×0.47× 0.005 inch) were cut from the laminate. The PTC elements were then heat-treated in an oven with settings such that the temperature of the elements reached 165° C. for 30 seconds, 5 to 10 seconds of which were at a peak temperature of 185° C. The PTC elements were then irradiated to a total of 10 Mrads using a Co$^{60}$ γ irradiation source. Nickel metal leads with dimensions of 4×17×0.13 mm (0.16×0.67×0.005 inch) were attached to opposite sides of the PTC element by reflowing the solder. The metal leads were each positioned so that a tab 5 mm (0.20 inch) extended from the edge of the PTC element. Each device was temperature cycled six cycles from −40° C. to 85° C. with a dwell time at −40° C. and 85° C. of 30 minutes.

After temperature cycling, devices were tested for voltage withstand, resistance, and switching temperature. Voltage withstand was measured by inserting a device into a circuit in series with a switch and a DC power source. Starting at 10 VDC, power was applied in increments for 5 seconds, then turned off for 60 seconds. The device was deemed to have failed when a lead or an electrode came off or when the device arced and burned. Devices of the example had excellent voltage withstand at 24 volts, suitable for use in most rechargeable battery applications which require 16 to 24 volt withstand.

The devices had a resistance at 20° C. of 0.025 ohm, substantially lower than a conventional device prepared from a mixture of ethylene/n-butyl acrylate copolymer and high density polyethylene as described in U.S. patent application Ser. No. 08/255,497 (Chu et al, filed Jun. 8, 1994), now U.S. Pat. No. 5,582,770, the disclosure of which is incorporated herein by reference. The conventional device had a resistive element with dimensions of 5×12×0.25 mm (0.2×0.47×0.010 inch), and had been processed by irradiating the laminate to a total of 10 Mrads prior to cutting PTC elements from the laminate. The resistance at 20° C. of the conventional device after temperature-cycling was 0.055 to 0.060 ohm, too high for many battery applications. A conventional device of ethylene/n-butyl acrylate copolymer and high density polyethylene, made with the same surface area and processing as the conventional device described above, but with a resistive element thickness of 0.13 mm (0.005 inch), would have a resistance at 20° C. of about 0.027 ohm. However, the voltage withstand of such a device would be less than 16 volts and thus not suitable for battery applications.

The resistance versus temperature properties of the device of the invention were determined by positioning the device in an oven and measuring the resistance at intervals over the temperature range 20 to 160 to 20° C. The switching temperature $T_s$, as defined above, was 93° C.

What is claimed is:

1. A circuit protection device for protecting batteries which comprises
   (A) a resistive element which is composed of a positive temperature coefficient (PTC) conductive polymer composition which comprises
      (1) a polymeric component having (a) a crystallinity of less than 40% and (b) a melting point $T_m$ of less than 110° C., and
      (2) dispersed in the polymeric component, a particulate conductive filler; and
   (B) two electrodes which (1) are attached to the resistive element, (2) comprise metal foils, and (3) can be connected to a source of electrical power, said device having the following characteristics:
      (i) a resistive element thickness of 0.025 to 0.20 mm;
      (ii) a crosslinking level equivalent to 1 to 20 Mrads;
      (iii) a surface area of at most 120 mm$^2$;
      (iv) a resistance at 20° C., $R_{20}$, of at most 0.030 ohm; and
      (v) a resistivity at 20° C., $\rho_{20}$, of at most 2.0 ohm-cm.

2. A device according to claim 1 wherein the conductive filler comprises carbon black which has a DBP number of 60 to 120 cm$^3$/100 g.

3. A device according to claim 1 wherein the polymeric component comprises polyethylene, an ethylene copolymer, or a fluoropolymer.

4. A device according to claim 3 wherein the polymeric component comprises low density polyethylene or ethylene butyl acrylate copolymer.

5. A device according to claim 1 which further comprises at least one lead attached to one electrode.

6. A device according to claim 5 which comprises two leads, a first lead attached to one electrode and a second lead attached to the other electrode.

7. A device according to claim 1 wherein the device has a switching temperature $T_s$ of less than 95° C.

8. A device according to claim 1 wherein $T_m$ is at least 70° C.

9. A device according to claim 1 which has been prepared by a method which comprises the steps of
   (a) cutting the device from a laminate comprising the conductive polymer composition positioned between two metal foils;
   (b) exposing the device to a thermal treatment at a temperature $T_t$ which is greater than $T_m$ after the cutting step; and
   (c) crosslinking the conductive polymer composition after the thermal treatment step.

10. An assembly which comprises
   (I) a battery; and
   (II) a circuit protection device which is in electrical contact with the battery and which comprises
      (A) a resistive element which is composed of a positive temperature coefficient (PTC) conductive polymer composition which comprises (1) a polymeric component having (a) a crystallinity of less than 40% and (b) a melting point $T_m$ of less than 110° C., and
(2) dispersed in the polymeric component, a particulate conductive filler; and
(B) two electrodes which (1) are attached to the resistive element, (2) comprise metal foils, and (3) can be connected to a source of electrical power, said device having the following characteristics:
(i) a resistive element thickness of 0.025 to 0.20 mm;
(ii) a crosslinking level equivalent to 1 to 20 Mrads;
(iii) a surface area of at most 120 mm$^2$
(iv) a resistance at 20° C., $R_{20}$, of at most 0.030 ohm; and
(v) a resistivity at 20° C., $\rho_{20}$, of at most 2.0 ohm-cm.

11. An assembly according to claim 10 wherein the battery is a rechargeable battery.

12. An assembly according to claim 11 wherein the battery is a nickel-cadmium battery, a nickel-metal hydride battery, or a lithium battery.

13. An assembly according to claim 10 which comprises first and second batteries and wherein the circuit protection device contacts the first and second batteries.

14. An assembly according to claim 13 wherein the device contacts a button terminal on the first battery.

15. An assembly according to claim 10 wherein the battery is a AA, a AAA, or a prismatic cell battery.

16. An assembly according to claim 10 which is suitable for use at voltages of at most 24 VDC.

17. An assembly according to claim 10 wherein the device comprises two leads, a first lead attached to one electrode and a second lead attached to the other electrode.

* * * * *

UNITED STATES PATENT AND TRADEMARK OFFICE

CERTIFICATE OF CORRECTION

PATENT NO. : 5,801,612

INVENTOR(S) : Chandler et al.

DATED : September 1, 1998

It is certified that error appears in the above-identified patent and that said Letters Patent is hereby corrected as shown below:

Column 3, line 12, replace "5,582,771" by --5,582,770--.

Column 6, line 4, replace "Tt" by --$T_t$-- and "T.," by --$T_m$,--.

Column 7, line 27, replace "ram" by --mm--.

Signed and Sealed this

First Day of December, 1998

BRUCE LEHMAN

*Attest:*

*Attesting Officer*   *Commissioner of Patents and Trademarks*